Jan. 31, 1939.  M. ARTZT  2,145,285
FACSIMILE RECEIVING SYSTEM AND APPARATUS THEREFOR
Filed Jan. 16, 1931
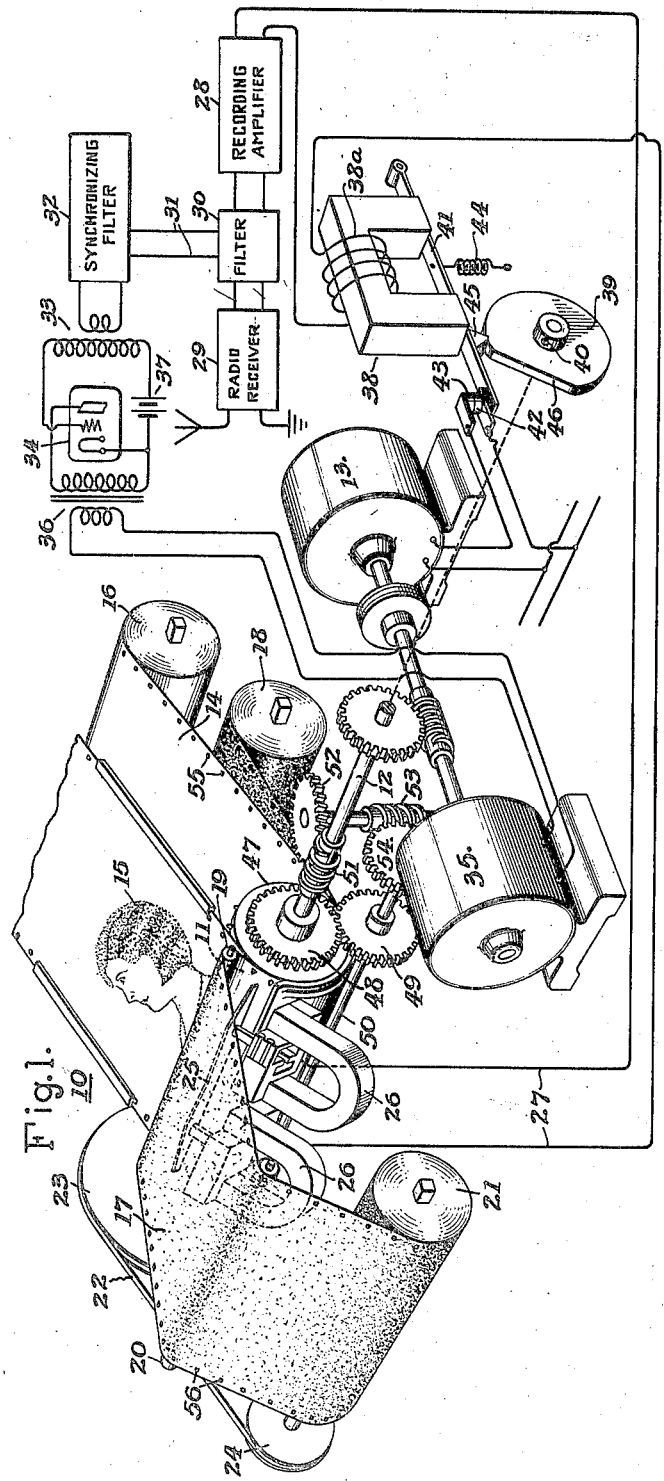
INVENTOR
Maurice Artzt,
BY
HIS ATTORNEY.

Patented Jan. 31, 1939

2,145,285

UNITED STATES PATENT OFFICE 2,145,285

FACSIMILE RECEIVING SYSTEM AND APPARATUS THEREFOR

Maurice Artzt, Haddonfield, N. J., assignor, by mesne assignments, to Radio Corporation of America, New York, N. Y., a corporation of Delaware Application January 16, 1931, Serial No. 509,204

9 Claims. (Cl. 178—6.6)

My invention relates to improvements in facsimile receiving systems and apparatus therefor, and more particularly to the means for keeping the apparatus in frame.

It is essential, for successful broadcast facsimile recording, that the recorder synchronize and frame itself automatically.

One system proposed for this purpose was of the intermittent-clutch type. In this system, the scanning mechanism of the recorder was driven at a slightly higher rate than the transmitter scanner. The arrangement was such that, upon disengagement of the clutch, a peg became effective as a stop to prevent further rotation of the recorder drum. Responsive to a starting impulse from the transmitter, the clutch engaged, and the recorder drum made one complete turn within a period of time slightly less than the period elapsing during the corresponding and simultaneously occurring turn or revolution of the transmitter. At the completion of each turn, the clutch was disengaged to cause the recorder drum to stop on the peg. Upon the subsequent completion of the turn of the transmitter, at which time another starting impulse was transmitted, the clutch associated with the recorder drum was again engaged to cause the latter to complete another turn on the next cycle of operation. Due to the relatively coarse teeth on the clutch, and the slowing down of the driving motor for the recorder drum at each starting of the latter, the framing of each scanning line, in systems of this type, might vary as much as the angular width of one tooth on the clutch. It can be said, generally, that these systems have not been satisfactory due to mechanical complexities which appear in the design of a clutch and trigger device suitable to satisfy the exacting requirements for a broadcast facsimile recorder. Furthermore, these systems, due to the stop-start action, have definite limitations in the way of speed of operation.

Another system proposed for the automatic synchronizing and framing of facsimile recorders involved the use of a three-leg transformer, the arrangement being such that when the recorder was out of frame a winding on the center leg, through certain instrumentalities, became effective to cause saturation of the core. This action, due to the arrangement of the parts, caused the driving motor for the recorder drum to fall out of step for a few cycles. Such operation was repeated during each succeeding revolution of the recorder drum until the same was again in frame. A difficulty encountered with this system was due to an appreciable time-lag of core saturation, which prevented response of the apparatus within the period of about one fiftieth of a second required for accurate framing.

Still another system proposed for the purposes referred to involved the use of a thyratron effective, when the recorder drum was out of frame, to draw plate current and load an alternator beyond the load which the driving motor for the drum could pull at synchronous speed. This action occurred during each succeeding rotation of the recorder drum until the same was again in frame. This system has the disadvantage that operation of the thyratron might interfere with nearby radio receivers. Another disadvantage lies in the fact that during the framing operation a heavy overload was imposed on the alternator.

With the foregoing in mind, it is one of the objects of my present invention to provide an improved facsimile receiving system wherein the recorder synchronizes and frames itself automatically, and in which the framing means has all of the desirable characteristics for satisfactory operation, but none of the disadvantages referred to and which are found in the various systems proposed heretofore.

Other objects and advantages will hereinafter appear.

In accordance with my invention, facsimile recording apparatus is framed by means including a relay for controlling the driving motor for the recorder, and a cam driven by the motor and operating to control the relay.

My invention resides in the features of construction, arrangement, and combination of the character hereinafter described and claimed.

For the purpose of illustrating my invention, one embodiment thereof is shown in the drawing, wherein—

Fig. 1 is a perspective view, partly diagrammatic, of a facsimile receiving system and apparatus embodying my invention;

Fig. 2 is a detail, graphical illustration of the framing and printer current received for one scanning line; and Figs. 3 and 4 are graphical illustrations of the audio and radio spectrums respectively for the transmitted synchronizing tone, the framing impulses, and the picture impulses.

With reference to Fig. 1, the reference numeral 10 designates facsimile receiving apparatus of the general type shown and described in detail in Patent No. 1,848,802 issued to Charles J. Young, March 8, 1932. This type of apparatus is referred to as a carbon paper recorder, and comprises a cylinder 11 fixed to a rotatable shaft 12 driven by a motor 13 through suitable gearing, as shown. The paper 14, on which the facsimile 15 is printed, comes from a supply roll 16 and passes around the cylinder 11 next to the surface thereof. Suitable carbon paper 17, supplied from a roll 18, also passes around the cylinder next to the paper 14, and thence over guide rolls 19 and 20 to a take-up roll 21. The carbon paper is kept taut between rolls 19 and 21 by making pulley 23 slightly larger in diameter than pulley 24, the slip of belt 22 on pulley 24 allowing for this arrangement.

The cylinder 10 is provided on the surface thereof with a spiral ridge (not shown).

The facsimile 15 is printed on the paper 14 by the action of a printer bar 25 actuated by suitable electromagnetic devices 26 having their operating coils connected by lines 27 to the usual amplifier 28 of the detected framing and picture impulses from a radio receiver 29. These impulses are separated from the received synchronizing impulses by a suitable high-pass filter 30, the synchronizing impulses being fed by lines 31 through a suitable low-pass filter 32 supplying a transformer 33 which impresses the synchronizing tones on the grid of a pliotron 34. An alternator 35, driven by motor 13, delivers a current of the same frequency as the incoming synchronizing tone when the motor drives cylinder 11 at the proper speed for synchronism with the transmitter. The pliotron 34 operates as the connecting link between the incoming synchronizing tone and the alternator 35, receiving its plate voltage from the alternator through a suitable step-up transformer 36. The grid voltage of the pliotron is supplied by the received synchronizing tone and a bias battery 37.

The amount of plate current drawn at any instant from the alternator by the tube depends entirely on the grid voltage at that instant. When the plate is negative, no current can flow. When the plate becomes positive, and if the grid is not too far negative, some current will flow. As the grid becomes less and less negative while the plate is on the positive side, the plate current increases, and therefore the load on the alternator increases. From the foregoing it will be seen that variation in the phase relation of the grid and plate voltage is accompanied by a corresponding variation in the load on the alternator, and consequently a corrective variation in the speed of the motor 13. The bias battery 37 is adjusted so that the phase position of the plate voltage shifts with an occurring variation in motor speed so that the load on the alternator is increased if the motor speed increases, and, conversely, so that the load on the alternator is decreased if the motor speed decreases. The system therefore runs synchronously with the incoming synchronizing tone if the occurring variations in motor speed do not become too large. As the load on the motor, aside from the alternator load, is constant, it can be said that any variation in motor speed would be due only to variation in the supply voltage to the motor. This supply voltage, it has been found, can vary over an appreciable range without throwing the system out of step.

The framing means for the recorder comprises a relay 38 and a cam 39 fixed on the end of shaft 12 by a set screw 40. The armature 41 of the relay carries a contact 42 engageable with a fixed contact 43 to close the operating circuit for motor 13. A tension spring 44 biases the contact 42 out of engagement with contact 43. The high edge of cam 39, which is circular in configuration, engages a rider 45 on the end of armature 41 to hold the contacts 42 and 43 in engagement to maintain the operating circuit for motor 13 against the action of spring 44. A portion of the cam is cut away, as shown, to provide a flat or straight edge 46. The winding 38a of the relay is connected in one of the lines 27, in series with the operating windings of the electromagnetic devices 26.

For the purpose of feeding the paper 14 and the carbon paper 17 through the recorder at the proper rate, a sprocket wheel 47 and a gear 48 are loosely mounted on shaft 12 at each end of cylinder 11, the gears 48 meshing with gears 49 fixed on a shaft 50. The shaft 50 is driven from shaft 12 through the worm 51, gear 52, worm 53 and gear 54.

The teeth of the sprocket wheels 47 enter perforations 55 and 56 in the edges of the paper 14 and the carbon paper 17 to provide a positive driving connection to insure for uniform feeding of the paper.

Considering now the action at the transmitter, a framing signal is transmitted with the picture impulses, this signal being at one and the same end of each scanning line, and occurring during that part AB of the scanning period AC.

As represented in Fig. 3, a steady 230 cycle synchronizing tone is developed at the transmitter, together with a chopper tone of 3000 cycles modulated by the framing and picture impulses. As represented in Fig. 4, the synchronizing tone and the modulated chopper tone are transmitted on a suitable radio carrier wave. These two tones, after being detected in the receiver 29, are separated by the high-pass filter 30, the framing and picture impulses going to the amplifier 28, and the synchronizing impulses going to the low-pass filter 32.

The operation of my improved system is as follows: The series-connected windings of relay 38 and the electromagnetic devices 26 are excited by the picture current which varies in accordance with the conditions of light and shade of the successive elemental areas of the picture scanned at the transmitter. When this current flows, the printer bar 25 is depressed to pinch the paper 14 and 17 between itself and the spiral ridge on the surface of drum 11. This action causes a mark to be printed on an elemental area of the paper 14. The relation between the conditions of light and shade of the marks is determined by the manner of variation of the received picture current, and is therefore the same as such relation of the respective elemental areas scanned at the transmitter.

The cylinder 11 is driven by motor 13 at a relatively high rate of speed, while the sprocket wheels 47 for feeding the paper through the apparatus are rotated at a relatively low rate, as provided by the worm 51 and gear 52, and the worm 53 and gear 54. The apparatus 10 completes one scanning line for each revolution of the cylinder 11. Satisfactory results have been obtained by driving the cylinder 11 at the rate of 120 R. P. M., to scan 120 lines a minute, under which conditions, the sprocket wheels 47 were caused to rotate at such rate as to feed the paper at the rate of about one inch per minute. These rates may, however, be varied over a wide range to suit particular requirements.

The pliotron 34 and associated parts operate, as explained above, to control the motor speed in such manner as to cause the cylinder 11 to rotate at the same rate as the rate of operation of the transmitter scanner.

When the apparatus 10 is in frame, the circular edge of the cam engages the rider 45, during the period of time BC that the picture or printer current is received, to lock the relay armature 41 in the position shown to maintain engagement of the contacts 42 and 43. During the period of time AB that the framing current is received, the straight edge 46 of the cam passes under the rider 45, this current being just effective to hold the armature 41 in the contact-closing position shown against the opposing action of the biasing spring 44. That is, the design is such that the current through winding 38a must be above a predetermined value to hold the armature closed, this value being well above the average value of the picture current.

If the apparatus is out of frame during any revolution of cylinder 11, the period of time AB will not coincide with that period during which the straight edge 46 of the cam passes under rider 45. There will be an interval, therefore, during which the armature 41 is held in contact-closing position neither by engagement of the circular edge of the cam with rider 45 nor by the excitation of the relay winding 38a by the framing impulse. During this interval, the armature 41 will be free to move outwardly to the motor-controlling position under the biasing action of spring 44 and open the contacts 42 and 43. The motor supply circuit is opened in this manner for an interval of time during each revolution of cylinder 11, and the speed of the motor reduced accordingly until the apparatus 10 is again in frame.

I claim as my invention:

1. In a facsimile receiving system, recording apparatus provided with scanning means, an electrical system for receiving transmitted electrical impulses representing lines scanned at the transmitter, certain of said impulses being picture impulses and certain of the same being framing impulses, means for driving said apparatus continuously and at a constant rate, relay means for controlling said driving means and biased to controlling position, and means driven by said driving means and arranged to engage said relay means intermittently to hold the same out of controlling position substantially during the periods of reception of said picture impulses and to permit movement of said relay means into controlling position substantially during the periods of reception of said framing impulses, said relay means being responsive to said framing impulses and operable upon occurrence of such to hold itself out of controlling position.

2. In a facsimile receiving system, recording apparatus having a printer element, electromagnetic means for controlling printing action of said element, framing means for said apparatus including mechanically cooperating cam and relay means, said cam being arranged to engage said relay means intermittently, means common to said apparatus and cam means for driving the same continuously and at a constant rate, and an electrical system for receiving transmitted picture and framing impulses and connected to said electromagnetic and relay means for supplying to each of the same the picture and framing impulses.

3. In a facsimile receiving system, means for developing a facsimile, means for framing said facsimile-developing means, said framing means including a cam and a relay mechanically controlled thereby, and means common to said facsimile-developing means and said cam for driving the same continuously and at a constant rate, said driving means being controlled by said relay.

4. In a facsimile receiving system, means for developing a facsimile and having a definite cycle of operation, means for framing said facsimile-developing means, said framing means including a relay and a cam, means common to and having a positive connection with said facsimile-developing means and said cam for driving the same continuously and at a constant rate, said cam operating to lock said relay in a given position during a predetermined and the same part of each period of time required for the completion of each cycle of operation of said facsimile-developing means.

5. In a facsimile receiving system, means for developing a facsimile, a motor for driving said means continuously and at a constant rate, a supply circuit for said motor, and means for framing said facsimile-developing means; said framing means comprising contacts for opening and closing said supply circuit, a relay for opening and closing said contacts, said relay biased to contact-opening position, and a cam driven by said motor and cooperable with said relay to lock the same in contact-closing position during a part only of the operating period of said cam, said relay being operable upon excitation thereof by a current above a predetermined value to maintain said contacts closed independently of said cam.

6. In a synchronizing system of the character described, a motor, a speed-control circuit for said motor, switch means associated with said circuit, an electromagnet provided with an armature for actuating said switch means, a rotatable element driven by said motor and effective during rotation to alternately lock said armature in a given position and release said armature, said armature being biased to move out of said given position upon being released, and means for supplying electrical signals to said electromagnet at a rate corresponding to the desired rate of rotation of said element and each of which is effective to hold said armature in said given position when the latter is released by said element.

7. In a synchronizing system of the character described, a motor, a speed-control circuit for said motor, switch means associated with said circuit, an electromagnet provided with an armature for actuating said switch means, a rotatable element driven by said motor and effective during rotation to alternately lock said armature in a position to close said switch means and release said armature, said armature being biased to move out of said position upon being released, and means for supplying electrical signals to said electromagnet at a rate corresponding to the desired rate of rotation of said element and each of which is effective to hold said armature in said position when the latter is released by said element.

8. In a synchronizing system of the character described, a motor, a speed-control circuit for said motor, switch means associated with said circuit, an electromagnet provided with an armature for actuating said switch means, a rotatable cam driven by said motor and disposed to alternately engage with said armature to lock the same in a given position and disengage from said armature to release the same, said armature being biased to move out of said given position upon being released, and means for supplying electrical signals to said electromagnet at a rate corresponding to the desired rate of rotation of said element and each of which is effective to hold said armature in said given position when the latter is released by said element.

9. In a facsimile receiver, a scanner, a source of power, a positive drive from said source of power to said scanner, a synchronizing magnet and means controlled by said magnet for disconnecting the positive drive by said source of power in the event the receiver is not in synchronism with the received signals.

MAURICE ARTZT.